United States Patent [19]
Ono

[11] Patent Number: 5,088,743
[45] Date of Patent: * Feb. 18, 1992

[54] COMBINED OIL RING ASSEMBLY

[75] Inventor: Sumio Ono, Kashiwazaki, Japan

[73] Assignee: Kabushiki Kaisha Riken, Japan

[*] Notice: The portion of the term of this patent subsequent to Aug. 27, 2008 has been disclaimed.

[21] Appl. No.: 650,995

[22] Filed: Feb. 4, 1991

Related U.S. Application Data

[63] Continuation of Ser. No. 438,071, Nov. 20, 1989, abandoned.

[51] Int. Cl.⁵ ............................................. F16J 9/06
[52] U.S. Cl. .................................. 277/141; 277/139
[58] Field of Search ....................... 277/139, 140, 141

[56] References Cited

U.S. PATENT DOCUMENTS

| | | | |
|---|---|---|---|
| 2,893,798 | 7/1959 | Olson | 277/139 |
| 3,166,331 | 1/1965 | Warrick | 277/139 |
| 3,338,582 | 8/1967 | DeBruin | 277/139 |
| 4,722,535 | 2/1988 | Maeda et al. | 277/140 |

FOREIGN PATENT DOCUMENTS 1029205 4/1958 Fed. Rep. of Germany ...... 277/139

Primary Examiner—William A. Cuchlinski, Jr.
Assistant Examiner—Daniel G. DePumpo
Attorney, Agent, or Firm—Finnegan, Henderson, Farabow, Garrett & Dunner

[57] ABSTRACT

A combined oil ring assembly consisting of a corrugated, annular expander having abutting ends and a pair of upper and lower side rails, the rails resting on the upper and lower sides of the expander and engaging a plurality of circumferentially spaced ear portions formed on the two sides of the expander. To strengthen the ends of the expander, the ear portions of the expander nearest to its two abutting ends, only have cut-outs on their sides remote from the ends and nearest to the next adjacent ear portions.

1 Claim, 4 Drawing Sheets

COMBINED OIL RING ASSEMBLY

This application is a continuation of application Ser. No. 07/438,071, filed Nov. 20, 1989, now abandoned.

BACKGROUND OF THE INVENTION

The present invention relates to a combined oil ring assembly which has an expander improved with fatigue resistance. The combined oil ring assembly or oil control piston ring includes the expander and side rails seated on upper and lower surfaces of the expander, which is fitted into the groove of a reciprocating piston primarily employed in internal combustion engines. The outer peripheral edges of the side rails will contact the inner wall of the cylinder and prevent leakage of oil due to a spring-like property of the expander.

DESCRIPTION OF THE PRIOR ART

The combined oil ring assembly according to a prior art as illustrated in FIGS. 4 and 5 includes an expander 5 having the base portion 2 extending circumferentially and formed with a plurality of corrugations in the diametrical direction. The expander 5 is further provided with ear portions 3 and seat portions 4 spaced from each other in the circumferential direction at the lower and the upper portions of said base portion 2. The oil ring assembly further includes a pair of side rails 6 the inner circumferential face of which will abut on the ear portions. The expander 5 thus constituted will be formed by a piece of the strip as shown in FIG. 4. As it is apparent from FIG. 4, semi-circular cut-out portions 3a are provided at the opposite sides of the ear portions at the upper and lower locations, so that adaptability of the rails 6 to the inner circumferential surface of the cylinder may be improved and wobbling of the piston may be prevented.

As shown in FIG. 5, the base portion 2 is so formed as to have corrugations and provided with the ear portions 3 at the inner circumference defined by said corrugations and the seat portions 4 at the outer circumference defined by said corrugations. The opposite ends 7 of the base portion 2 are abutted together face each other.

However in the combined oil ring assembly shown in FIGS. 3-5, the ear portions 3 adjacent to opposed ends 7 are likely to be broken. In order to clarify the cause of breakage, the stress at the respective portions of the expander against the tension in the radially outward direction has been measured and the result obtained by such a measurement is as illustrated in FIG. 6. As it is clearly seen from FIG. 6, the stress against the tension is considerably higher at the first corrugation viewed from the opposed end portions of the expander 5 (see FIG. 5) than at any other portions. More specifically, the high stress portion is subjected to fatigue much earlier than other portions and therefore breakage of that portion is believed to be easily caused.

SUMMARY OF THE INVENTION

Accordingly, an object of the present invention is to improve the fatigue resistant strength by modifying the configuration of the butting portions of the opposite ends of the expander.

According to the present invention, the foregoing object is attained by employing such a technical means as the cut-out portions at the upper and lower portions at least at one side of one or two ear portions adjacent to the butting portions of the opposed ends the expander of the combined oil ring assembly are eliminated or not formed.

Employment of this technical means enables the strength at the butting portions at the opposite ends of the expander to be increased and the fatigue resistant strength to be enhanced.

BRIEF EXPLANATION OF THE DRAWINGS

The present invention may be more clearly understood from the following description of a preferred embodiment taken in conjunction with the accompanying drawings in which.

DESCRIPTION OF A PREFERRED EMBODIMENT

Figure 1:
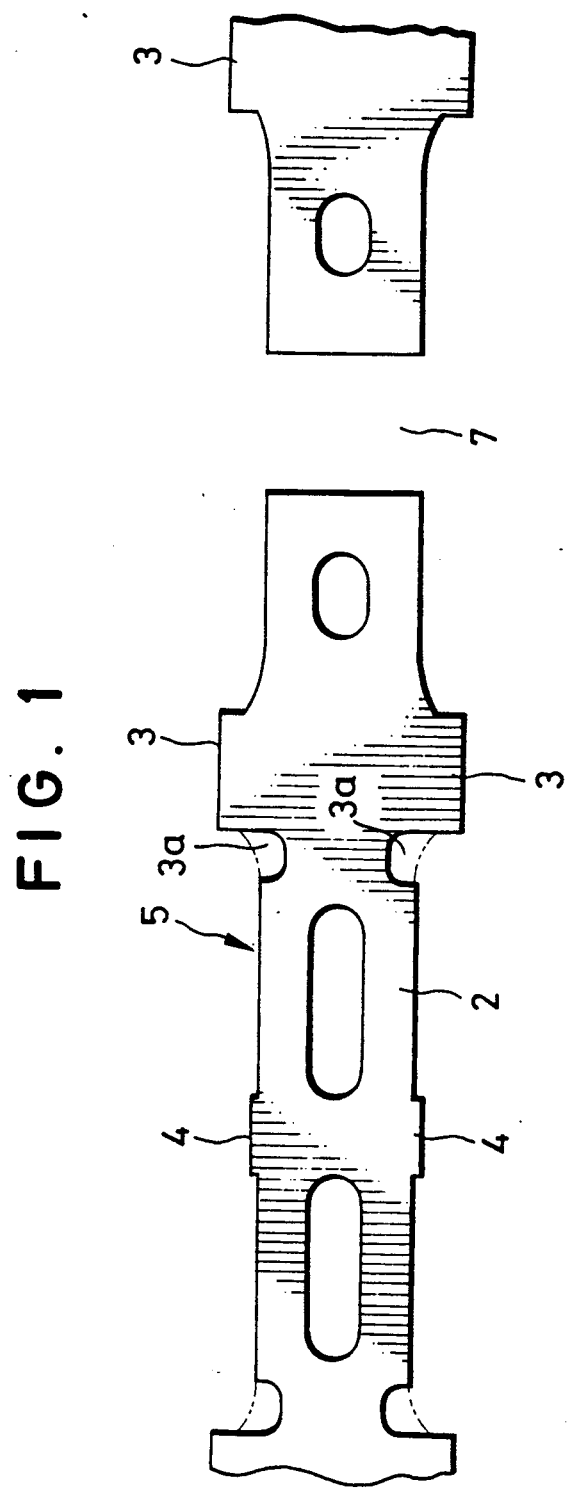
FIG. 1 is an elevation view of an example of the expander to be used in the combined oil ring assembly according to the present invention.
Figure 4:
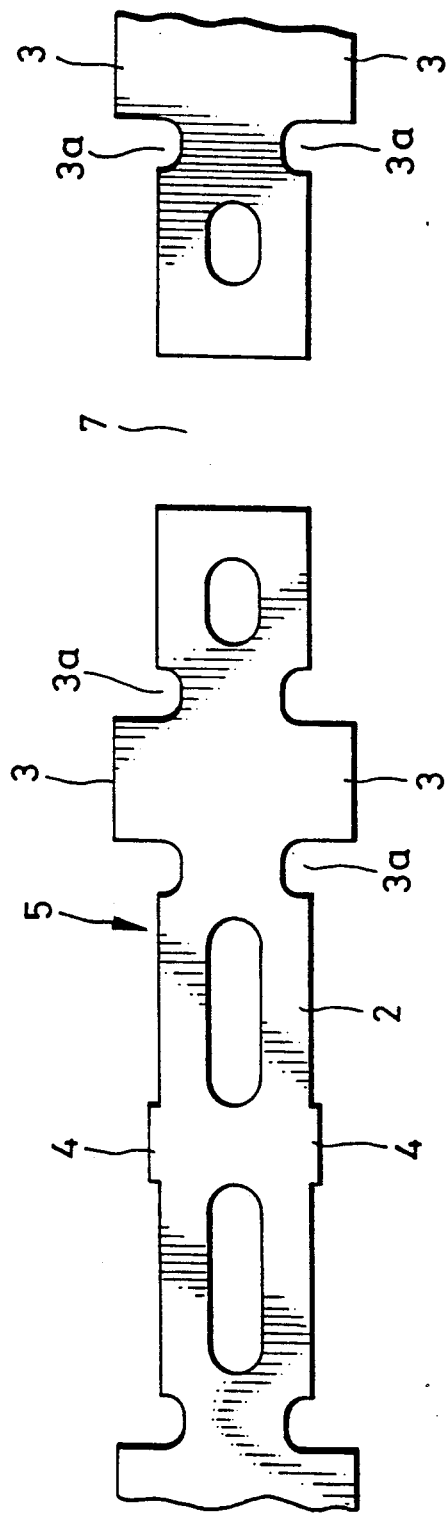
FIG. 4 is a development view of the expander according to the prior art.
Figure 5:
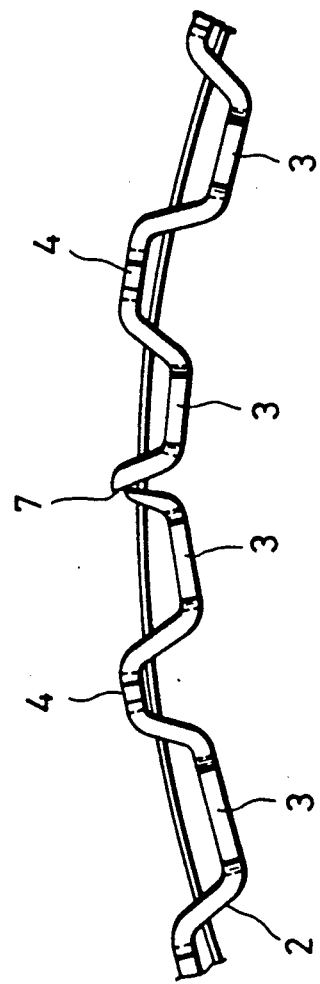
FIG. 5 is a partial plan view of the prior art expander; of FIG. 4.
Figure 6:
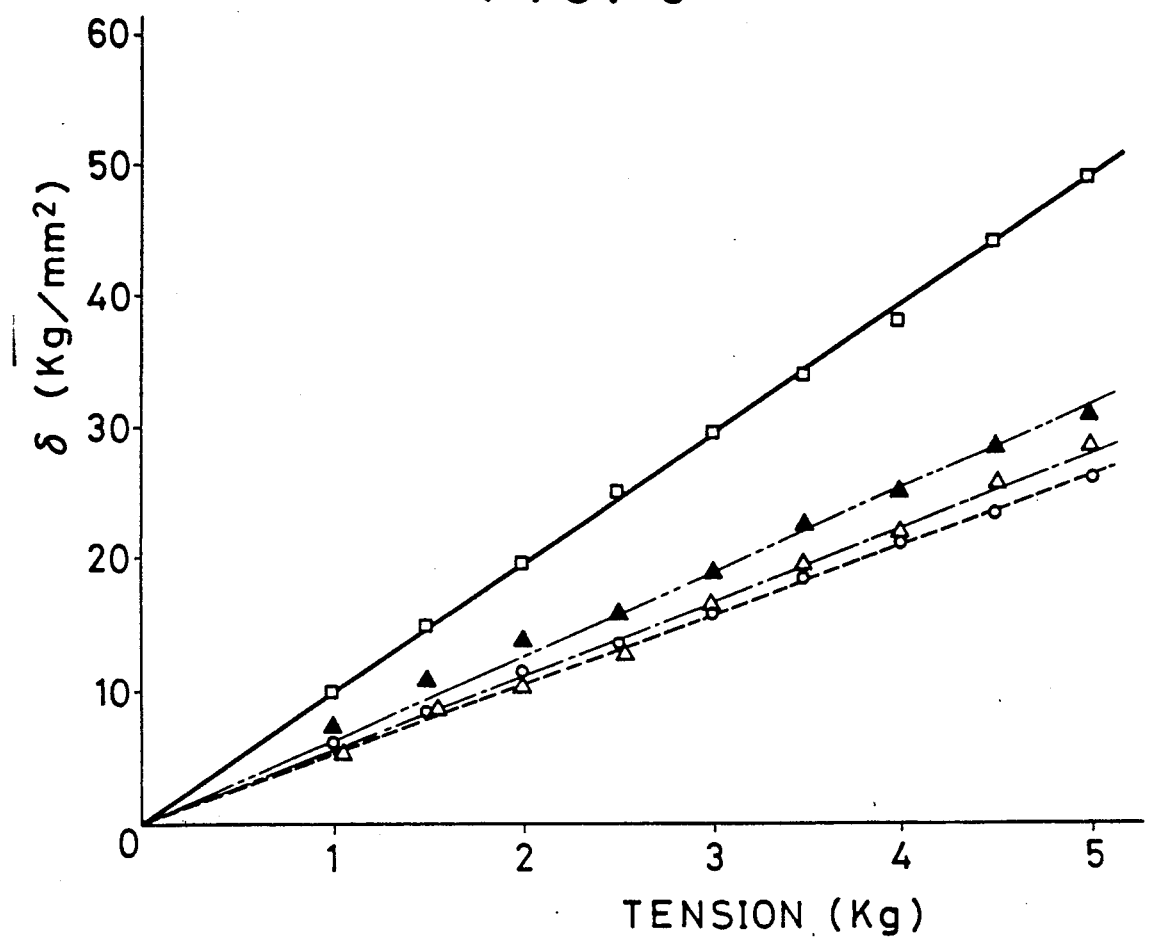
FIG. 6 is a graphic representation of the relationship between the tension and the stress.

The expander 5 of the combined oil ring assembly to which the present invention has been applied is shown in FIG. 1. Like numerals are applied to the like components in FIG. 4 and the explanations thereof are not repeated.

Figure 3:
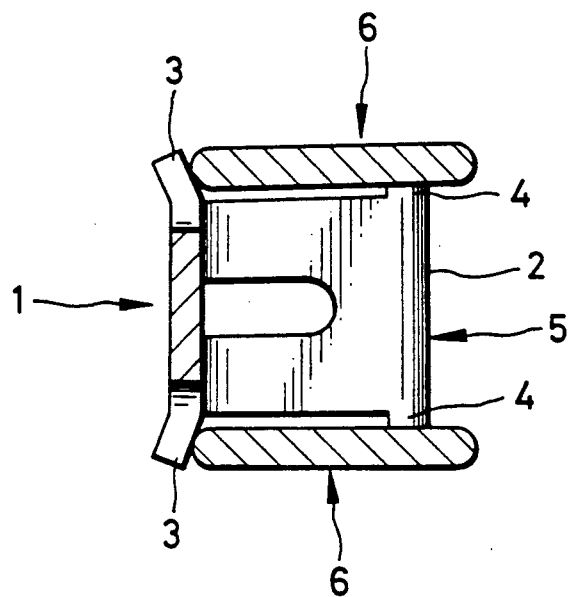
FIG. 3 is an elevation view of an example of the combined oil ring assembly.

The cut-out portions 3a at least at one side of one or two ear portions 3 adjacent to the abutment 7 at the opposite ends of the expander 5 are eliminated or not formed. Such an expander 5 having ear portions 3 near to the abutment 7 is formed in a normal way and assembled with the side rails (see FIG. 3).

Figure 2:
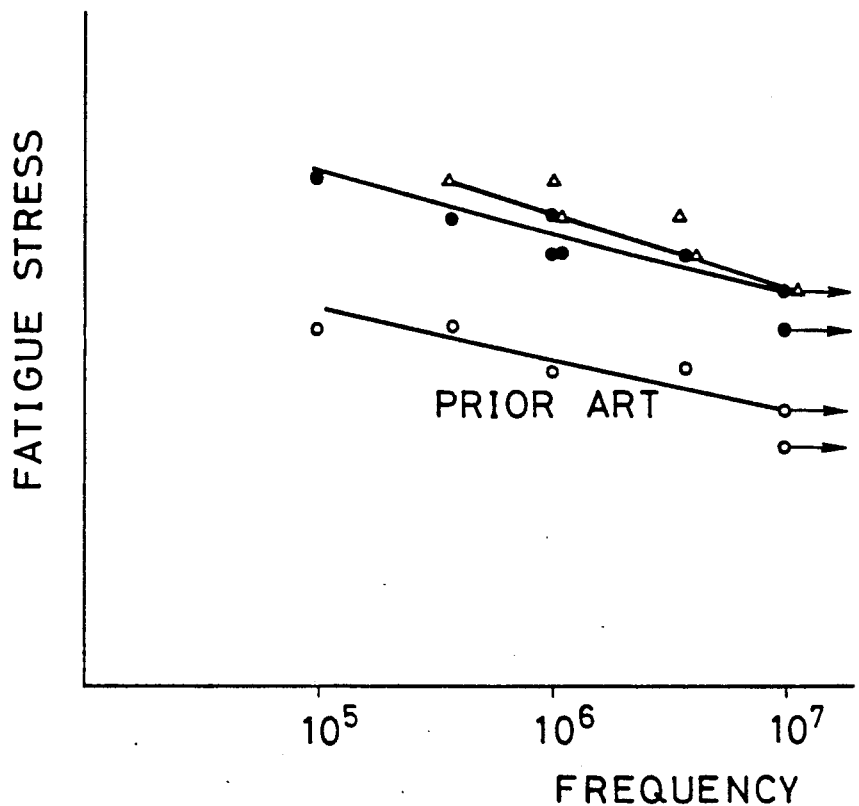
FIG. 2 is a graphic representation of the fatigue resistant strength relative to the reciprocating frequency of the oil ring.

The fatigue resistant strength of the expander 5 having a configuration as shown in FIG. 1 has been measured in relation to the reciprocation frequency of the piston and the result is shown in FIG. 2. In FIG. 2, △ represents the expander in which the cut-out portions at the opposite sides of the first ear portions and at one side of the second ear portions adjacent to the opposite ends of the abutment 7 are eliminated. represents the expander in which the cut-out portions only at one side (at the side of the abutment) of the ear portions 3 adjacent to the abutment are eliminated. ○ represents the expander according to a prior art in which the cut-out portions 3a are provided at the opposite sides of the ear portion adjacent to the abutment.

As it is clearly seen from FIG. 2, the combined oil ring assembly according to the present invention is capable of increasing the fatigue resistant strength by almost 40%. In FIG. 1, the dotted line represents the case in which the cut-out portions have been eliminated, namely, have not been formed.

The combined oil ring assembly which includes the improved expander as above explained will represent substantially the same values of oil consumption as that of the prior art in accordance with the test result or even somewhat lower values than that of the prior art in the range of higher reciprocation frequency. Furthermore, the adaptability of the present expander to the inner wall of the cylinder may exhibit better properties than the prior art. Accordingly, the present invention is capable of increasing the fatigue resistant strength by almost 40% over that of the prior art while keeping the oil consumption and the adaptability at a somewhat better level than the prior art.

As many apparently widely different embodiments of the present invention can be made without departing from the spirit and scope thereof, it is to be understood that the invention is not limited to the specific embodiments thereof except as defined in the appended claims.

What is claimed:

1. In a combined oil ring assembly comprising an annular expander and a pair of annular side rails, with the expander having a base portion extending in a circumferential direction and terminating in a pair of abutting end portions, said base portion having a plurality of corrugations formed in a radial direction and a plurality of rail engaging ear portions spaced from each other in a circumferential direction on upper and lower sides thereof, said base portion further having rail seat portions on upper and lower sides thereof located between said ear portions, said side rails engaging said rail seat portions and abutting against said ear portions at an inner peripheral surface of said rail seat portion, and a plurality of oil releasing bores provided in the base portion of said expander; the improvement comprising cut-out portions formed only on the upper and lower sides of the expander at one side of said upper and lower ear portions nearest to said abutting end portions, with said one side being the side nearer to next adjacent ear portions, and further cut-out portions formed on upper and lower sides of the expander at both sides of said next adjacent ear portions.

* * * * *